United States Patent [19]

Goldman

[11] Patent Number: 4,811,408
[45] Date of Patent: Mar. 7, 1989

[54] IMAGE DISSECTING DOCUMENT VERIFICATION SYSTEM

[75] Inventor: Robert N. Goldman, Honolulu, Hi.

[73] Assignee: Light Signatures, Inc., Los Angeles, Calif.

[21] Appl. No.: 119,936

[22] Filed: Nov. 13, 1987

[51] Int. Cl.[4] .............................................. G06K 9/00
[52] U.S. Cl. .......................................... 382/2; 382/50; 340/825.34
[58] Field of Search ........................... 382/2, 4, 50, 34; 340/825.3, 825.31, 825.33, 825.34

[56] References Cited

U.S. PATENT DOCUMENTS

| | | | |
|---|---|---|---|
| 3,924,105 | 12/1975 | Gassino et al. | 382/2 |
| 4,179,686 | 12/1979 | Bonicalzi et al. | 382/2 |
| 4,202,120 | 5/1985 | Engel | 382/4 |
| 4,253,086 | 2/1981 | Szwarcbier | 340/825.34 |
| 4,288,782 | 9/1981 | Bader et al. | 382/34 |
| 4,303,852 | 12/1981 | Silverman et al. | 340/825.34 |
| 4,554,591 | 11/1985 | Kee | 382/2 |
| 4,582,985 | 4/1986 | Löfberg | 382/4 |
| 4,677,479 | 6/1987 | Hatori et al. | 382/50 |

Primary Examiner—Leo H. Boudreau
Assistant Examiner—Donald J. Daley
Attorney, Agent, or Firm—Nilsson, Robbins, Dalgarn, Berliner, Carson & Wurst

[57] ABSTRACT

A document identification system incorporating an identification card bearing image indicia that is sensed and tested for comparison with reference data. The image indicia on the card, e.g. a photographic likeness of the card assignee, is dissected to provide representative pixel data. Individual image pixel representations are quantized, digitized and stored in an escort memory, e.g. a magnetic stripe on the card. The card is verified by again sensing the image indicia and processing the data as before. The resultant test data is correlated with the reference data from the escort memory. The composite indication of the correlation is manifest as an acceptance or a rejection and also as a two-dimensional binary display (black or white pixel areas) to reveal an analysis of the correlation for manual interpretation. The display is variable for different levels of detail.

10 Claims, 3 Drawing Sheets

IMAGE DISSECTING DOCUMENT VERIFICATION SYSTEM

BACKGROUND AND SUMMARY OF THE INVENTION

A continuing need exists for an improved system to verify and authenticate documents. The need exists in various fields for an apparatus to function in cooperation with documents that can be determined to be genuine and unmodified. Many forms of ID cards are employed in various applications embodied, for example, as passes, permits, licenses, financial cards and so on. Accordingly, several systems have been proposed to verify a specific form of card at an authentication terminal. One class of such systems utilizes indicia printed or otherwise affixed to a document as a basis for the authentication. For an identification card, the indicia might take the form of a fingerprint, a photograph, an account number or a signature.

An efficient indicia-based document verification system involves several considerations including, the ease of deciding the card's authenticity, the processing speed for attaining such a decision and the reliability of making the decision without error. In addition to detecting fakes, the system should not accept cards with an altered image. Yet, the system must not reject genuine cards with a stained, worn or faded image. If a genuine, unaltered card is rejected, it is embarrassing to all concerned and may even prompt legal action. In general, the system of the present invention responds to these considerations.

The system of the present invention may be embodied as a small, self-contained, point-of-use terminal that functions in cooperation with specific documents, e.g. a form of identification card. Each card carries image indicia along with an escort memory representative of at least a portion of the image indicia. For example, as image data, a card might contain the name of the holder, his card number and his photograph, any or all of which could be carried as image data (pixels) in a machine-readable form.

The card, embodied as an identification card, might take the specific form of a credit card or any of a multitude of other formats and may incorporate other features to secure the identification. For example, the card might incorporate features for on-line operation, value decrementing, alternative anticounterfeit characteristics and so on In the disclosed embodiment, a simple identification card is disclosed utilizing the elements of the present invention.

The terminal of the present invention senses the card both with respect to the image test data and data from the escort memory to provide sets of data which are correlated to authenticate the card. The correlation may be revealed as a result and also is revealed as a two-dimensional display of test results related to the image of interest. The display reveals specific areas of the card where a favorable comparison did not result from the correlation. Accordingly, an operator is provided an effective interface with the terminal to assist greatly in determining the authenticity of marginal or questionable cards.

BRIEF DESCRIPTION OF THE DRAWINGS

In the drawings, which constitute a part of this specification, exemplary embodiments of the invention are set forth as follows.

DESCRIPTION OF THE ILLUSTRATIVE EMBODIMENTS

As indicated above, detailed illustrative embodiments of the present invention are disclosed herein. However, physical identification media, data formats, display details and operating system structures in accordance with the present invention may be embodied in a wide variety of forms some of which may be quite different from those of the disclosed embodiments. Consequently, the specific structural and functional details disclosed herein are merely representative; yet in that regard they are deemed to afford the best embodiments for purposes of disclosure and to provide a basis for the claims herein which define the scope of the present invention.

Figure 1:
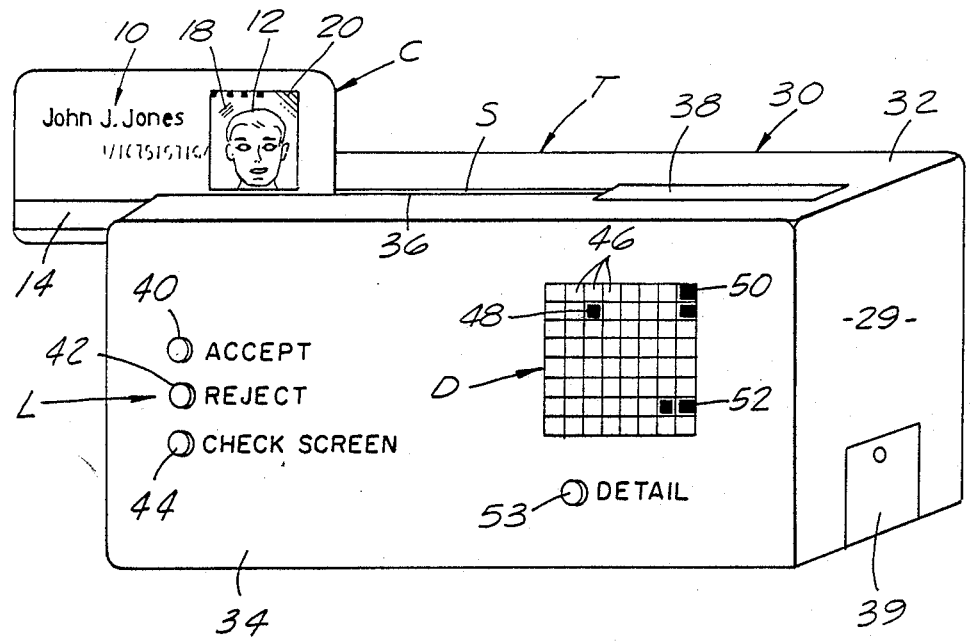
FIG. 1 is a perspective view illustrating a system of the present invention.

Referring initially to FIG. 1, a card C is shown posed for movement through a slot S in a terminal T. Essentially, the card C is moved manually from left to right in the slot S. At the end of the stroke, the card C momentarily drops into the terminal T to a fully concealed location. During such movement, the card C is sensed to provide data which is analyzed to selectively actuate signal lamps L and provide a display D.

As illustrated, the system is used by a person in a cooperative relationship to determine the likely authenticity of the card C. Specifically, the operator first glances at the card-holder and the card to establish that there is a reasonable degree of coincidence. Next, the card C is placed in the slot S of the terminal T and manually actuated through the sensing pattern. After the card C is sensed, the resulting data is processed to control the lamps L and the display D.

The operator is provided a first level of information by the lamps L and a second level by the display D. Essentially, the lamps L indicate either "accept", "reject", or "check screen". The instruction "check screen" refers to the display D. The creation of the display D is treated in detail below. As disclosed, in a black-and-white pattern, the display D reveals the specific areas of an image on the card C which fail to coincide with reference data for the image. With such information, the operator can effectively determine the authenticity of questionable cards.

Basically, area-by-area the terminal T determines the degree to which the image on the card C matches the machine-readable picture reference data recorded on the card. Coincidentally, the terminal determines whether the data on the card has been lifted from another card indicating, accordingly, the card is counterfeit. Finally, the terminal determines whether the image on the card has been altered. Thus, in total, an accurate appraisal of the card authenticity is facilitated.

As indicated above, a visual representation is provided on the display D indicating the locations of the image where discrepancies exist. The display indicates deviations which may be alterations on the card. Informed regarding the detail of the deviations, the operator is able to effectively authenticate cards.

Considering the apparatus of FIG. 1 in somewhat greater detail, the card C (see FIG. 2) has a traditional format and may be formed of plastic, paper laminate or any of a variety of other sheet materials as well known in the prior art. A specific individual subject is identified by the card as the assigned holder. Specifically, the card carries indicia in the form of print 10 and a photographic likeness 12. A magnetic stripe 14 is provided on the card, also as well known in the art.

The card C exemplifies a multitude of specific formats which may be utilized in accordance with the present invention. Generally, the card C carries image indicia (print 10 and photographic likeness 12) which is machine readable to provide representative picture data. Cards in accordance with the present invention also carry an escort memory exemplified by the magnetic stripe 14 on the card C.

Basically, the system of the present invention involves sensing the picture image indicia to provide pixel test signals which are compared with pixel reference signals provided from the escort memory. If the degree of coincidence is not sufficiently high to assume that the photograph has not been altered, the display D (FIG. 1) reveals the specific areas of the image which failed to coincide with the reference standard.

In the disclosed embodiment of the present invention, the test picture or image is restricted to the confines of the photographic likeness 12. Of course, as suggested above, in various applications and formats the test image might comprise any machine-readable indicia carried on a card.

Figure 2:
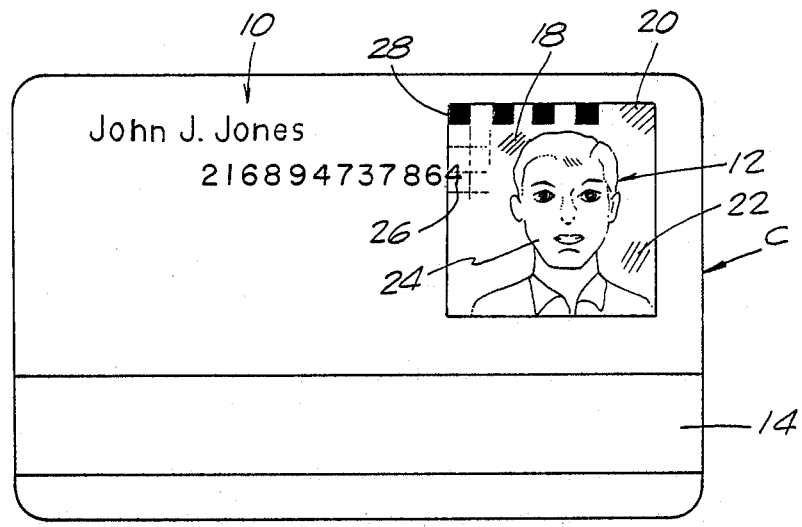
FIG. 2 is an enlarged plan view of a card as shown in FIG. 1.

As illustrated in FIGS. 1 and 2, the card C has some defects. Specifically, the card has mars 18, 20 and 22. The defects or mars 18, 20 and 22 might be stains, wear spots, faded areas or areas of alteration or tampering. In accordance with the principles of the present invention, in view of the locations of the mars 18, 20 and 22 (remote from the critical areas of the likeness 12) they are likely to be innocent.

In the operation of the disclosed embodiment, the mars 18, 20 and 22 are detected and specifically manifest in the display D (FIG. 1). Consequently, the operator of the terminal T can readily decide that the card is valid by observing the degree of coincidence between the critical areas of the photographic likeness 12 and the indicated areas of discrepancy. As indicated above, the illustrated favorable separation of the cardholder's likeness from the mars would normally indicate the card C to be authentic.

Considering the photographic likeness 12 of the card C in greater detail (FIG. 2), identification indicia includes the subject's face 24 and a portion of his account number 26. Also, the likeness includes a line 28 which is alternately black and white and which facilitates detection and scanning alignment of the photographic likeness 12 using well known prior-art techniques.

Referring back to FIG. 1, the terminal T for processing the card C will now be considered in greater detail. Essentially, the terminal T is embodied in a box or housing 30 incorporating an end panel 29, a top panel 32 (defining the slot S) and a front panel 34 which carries the operating instrumentation. The interior operating components of the terminal T are described and explained below.

The slot S in the top panel 32 is open at the left end (not shown) to receive the card C for movement through an initial length 36 in which the magnetic stripe 14 is read. At the right end, the slot S defines an enlarged section 38 through which the card drops to be completely received in the housing 30 for optical sensing of the photographic likeness 12. Accordingly, incorporating well known principles of the prior art, the initial motion of the card C is accomplished manually by moving the card through the length 36. When the card reaches the section 38, it is grasped mechanically to be lowered, sensed, then raised to extend from the housing 30 for convenient manual removal.

The end panel 29 of the housing 30 incorporates a door 39 for access to adjustment and preparation controls (not shown). Operating instrumentation is carried on the front panel 34 of the housing 30.

Considering the front panel 34 of the terminal T, the signal lamps L include: a green lamp 40 designated "accept"; a red lamp 42 designated "reject" and a yellow or amber lamp 44 designated "check screen". As indicated above, the lamps L provide a preliminary evaluation of card authenticity.

The front panel 3 also carries the display D. As illustrated, the display D is divided into an array of individual pixels 46 and is represented somewhat in an idealized form resembling a blank crossword puzzle. The face of the display device may be scored to indicate the grid lines. Also, the grid lines may be designated with coordinate numbers to assist in visual correlation.

To attain a more detailed display a button 53 can be depressed. Essentially, the result is to expand each pixel 46 in the display to four subpixels as explained below.

The display D is binary in the sense that pixels 46 are either black or white (no gray-scale pixels). The white display pixels indicate areas of acceptable comparison between the reference pixel data and the freshly observed test pixel data. Conversely, black display pixels indicate sub-image areas which do not meet a requisite degree of coincidence. Note that the black display pixels 50 coincide in area relationship with the mar 20 on the card C. In that regard, the mars 18, 20 and 22 (FIG. 2) are specifically designated by the display pixel groups 48, 50 and 52 (FIG. 1). Thus, the operator's attention is drawn specifically to the questionable areas of the picture enabling a rapid and effective determination by utilizing human facilities.

For a better appreciation of the development of the area-by-area relationship between the display D (FIG. 2) and the photographic likeness 12 (FIG. 2), reference will now be made to FIG. 3. The face 24 and digit 54 (numeral "4") of the account number 26 are shown superimposed on dissection pixel grid 60. Note that in the interests of effective explanation, the figures are not necessarily proportioned. Also in that regard, the pixel grid 60 is shown enlarged and idealized with square pixels. Note that the represented pixels 46 may be much larger than the pixels of the sensing apparatus. As a related consideration in that regard, as disclosed in detail below, subpixel displays are provided on demand to increase the detail.

Figure 3:
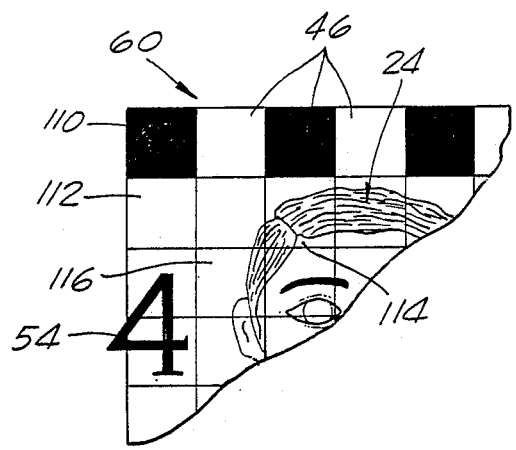
FIG. 3 is a fragmentary graphic representation illustrative of a phase of the operation of the system of FIG. 1.

In one sense, FIG. 3 illustrates by superimposition, the area relationship between the display D and the photolikeness 12. Further reference will be made below to FIG. 3 in relation to the dissection of the photographic likeness 12 into image pixels and the comparative test of such image pixels to binary values (black or white) for display pixels.

Figure 4:
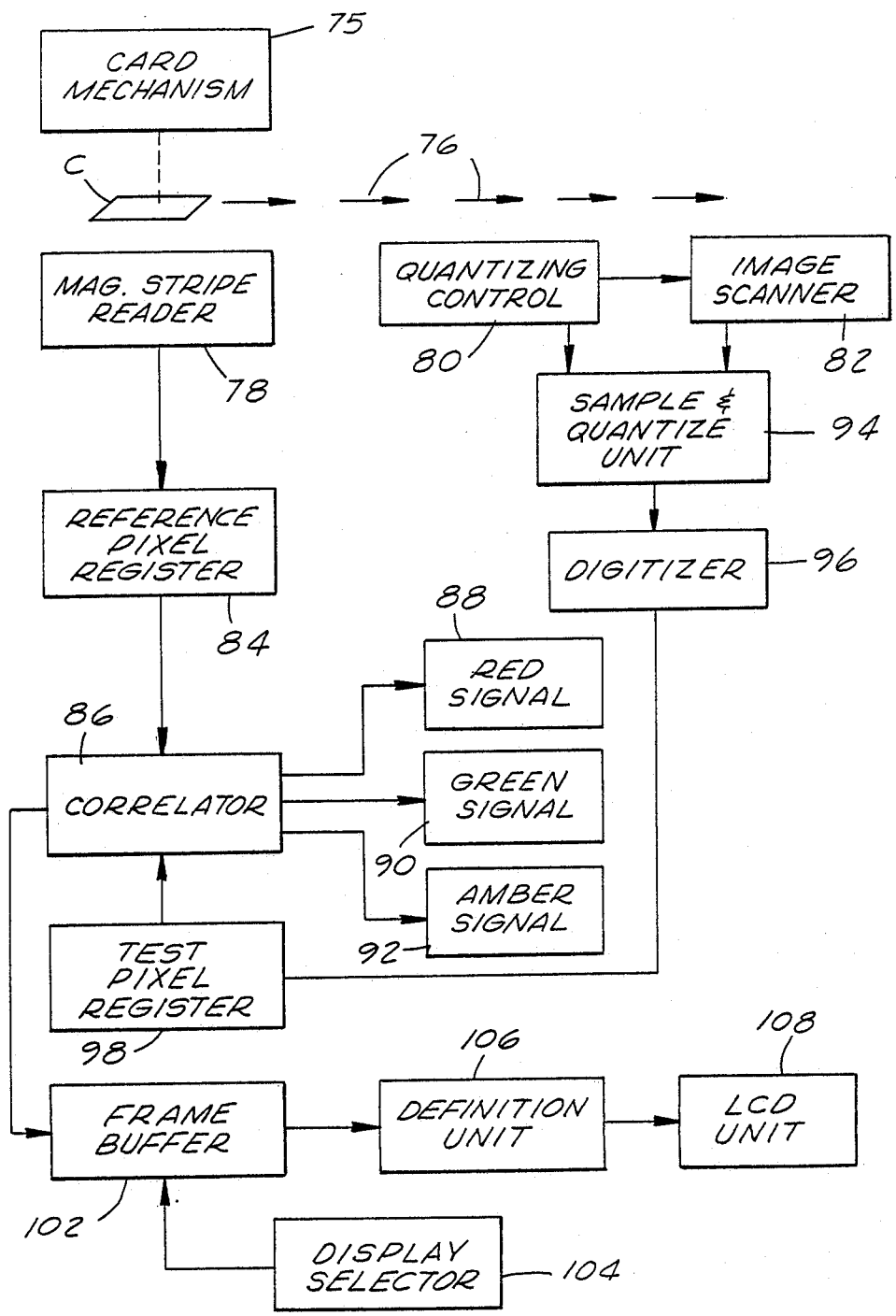
FIG. 4 is a block diagram of a terminal as shown in FIG. 1.

Reference will now be made to FIG. 4 which illustrates the structural apparatus embodied in the terminal T of FIG. 1. In that regard, as indicated above, the card C is guided for manual movement and is also moved by a mechanism. The structure for guiding and moving the card C is represented collectively by a block designated card mechanism 75 (upper left). The card mechanism 75 may take any of a variety of mechanical forms as well known in the prior art to guide and move documents for magnetic and optical reading.

As depicted symbolically in FIG. 4, the card mechanism 75 moves the card C along a path designated by arrows 76, exposing the card C in sequence to a magnetic stripe reader 78, a quantizing control 80 and an optical image scanner 82. Functionally, the magnetic stripe reader 78 senses the magnetic stripe 14 (FIG. 2). Next, the quantizing control 80 and the image scanner 82 optically sense and dissect the area of the photographic likeness 12. Thus, reference and test data are provided for subsequent processing.

As explained in greater detail below, the magnetic stripe 14 is recorded with image pixel reference data. Specifically, the magnetic stripe reader 78 senses the stripe 14 to provide reference data developed from a previous scanning and dissection of the photographic likeness 12. In verifying the card, the photographic likeness 12 is again sensed (by the quantizing control 80 and the scanner 82) to provide data which is processed for dissecting the image into image pixel test data. As explained in detail below, the terminal T correlates the test data with the reference data for a pixel-to-pixel determination which then energizes one of the signal lamps L and actuates the graphic binary pixel display D (FIG. 1).

The magnetic stripe reader 78 (FIG. 4) is coupled to a reference pixel register 84 for storing the reference data. From the register 84, signals representative of the reference data are supplied to a correlator 86. As explained in detail below, the correlator 86 receives test image pixel data to accomplish a comparison. As a result of the comparison (reference and test data), the correlator 86 selectively energizes one of the signal lamps, i.e. a red signal 88, a green signal 90 or an amber signal 92. The display D is also provided.

To provide the test data, the card C is freshly sensed by the quantizing control 80 and the image scanner 82. Those circuits are connected to a sample and quantize unit 94 which is in turn connected to an analog-digital converter or digitizer 96. Digital signals representative of individual image pixels are supplied from the digitizer 96 to a test register 98 which is in turn coupled to the correlator 86.

In addition to selectively actuating the color signals 88, 90 and 92, the correlator 86 also supplies binary pixel signals for actuating the display D as illustrated in FIG. 1. Specifically, binary signals representative of individual pixels for the display D are provided to a frame buffer 102. Various forms of frame buffers are well known in the prior art that are capable of functioning as the frame buffer 102 to provide a refreshed video display. In that regard, the buffer 102 is controlled by a display selector 104 for providing various display control formats. For example, as mentioned above, displays of different size pixel resolution may be provided. Selective portions of an image also could be displayed. Binary pixel signals for the display are provided from the frame buffer 102 through a definition unit 106 to a liquid crystal display 108.

Generally, depending on the application and objectives, displays of varying numbers of pixels may be selected. For example, a coarse display may involve an eight-by-eight array resulting in a sixty-four pixel display pattern. Somewhat higher definition may be provided by a sixteen-by-sixteen array of two hundred fifty-six subpixels. Such an array is considered in detail below as effective for the capacity of the magnetic stripe 14. However, further increased resolution and definition may be accomplished by the display of even more subpixels as, for example, a thirty-two-by-thirty-two display to provide one thousand twenty-four subpixels.

Preliminary to considering the detailed operation of a system as depicted in FIG. 4, some further explanation is appropriate with regard to the dissection of the image indicia as represented by the photographic likeness 12 (FIG. 2). The pixel data from the photographic likeness is quantized based on three amplitude ranges. For example, if individual pixels are sensed with a gray scale range of one hundred, individual pixels might be quantized to three amplitude classifications: zero through thirty-three; thirty-four through sixty-six and sixty-seven through ninety-nine. Quantization to a relatively small number of levels is effective, as will be apparent with further consideration. Some further analysis of FIG. 3 in that regard will be informative.

As indicated above, FIG. 3 represents an overlay of the black-and-white or binary pixel display D superimposed on the photographic likeness 12. Again, the representation is idealized and illustrated solely in the interests of facilitating explanation.

To consider the operation, it is convenient to treat individual pixels (rather than subpixels) for purposes of explanation. Accordingly, pixels of the photographic likeness 12 are reduced to reference and test signals. Some individual pixel analysis will be helpful. Again, assume a range or gray scale of pixel-sensed amplitude values from zero to ninety-nine. That is, such is the range of signal amplitudes manifesting the degree to which a pixel varies between black and white. As a specific example, note that a pixel 110 (upper right) is totally black (value zero) while a pixel 112 (immediately below) is completely white (value ninety-nine).

In an actual image, most pixels would fall someplace between the two extremes. For example, a pixel 114 (FIG. 3) might have an amplitude of sixty on a scale from zero to nine-nine. As another example, a pixel 116 might have an amplitude value of twenty. In the operation of the disclosed embodiment, individual pixels are quantized to represent three levels of signal amplitude or optical density, in relation to the average overall density of the image, e.g. photographic likeness 12. Image pixels are individually classed as: (a) definitely darker than the average overall density; (b) definitely lighter than the average overall density or (c) close to the average overall density. Only image pixels of classifications (a) and (b) are used to validate an image. However, it is necessary to record image pixels of class (c) to properly locate the positions in the photograph of other pixels.

The three distinct levels of represented image pixel optical density for the likeness 12 can be manifest by two binary bits. In accordance with the above classification, the representation of image pixel test and reference signals would be as follows:

(a) (definitely darker)—0 0
(b) (definitely lighter)—0 1
(c) (near average)—1 0

Consider now the format for the test and reference pixel data. Utilizing two binary bits to represent each image pixel (as indicated above) an array of two hundred fifty-six pixels requires a storage capacity of five hundred twelve binary bits. Assuming a somewhat conventional magnetic stripe of 3.375 inches and a recording density of two hundred ten bits per inch, approximately seven hundred bits can be recorded on a traditional card. Using five hundred twelve bits for the pixel data leaves nearly two hundred bits for other use including error detection, confirming identification and so on.

Correlation of the test and reference image pixels involves a one-to-one comparison for each area represented. That is, for each elemental area of the photographic likeness 12, the reference pixel signal (two bits) and the test pixel signal (two bits) are compared. A favorable comparison produces a binary display pixel representation for white, e.g. one. An unfavorable comparison produces a binary pixel representation for black, e.g. zero. Accordingly, such signal representations drive the frame buffer 102 for accomplishing the display D.

In view of the above description, the operation of the terminal T will now be considered in detail with reference to FIG. 4. In that regard, assume the presentation of a card C prepared and recorded as described above. With the aid of the card mechanism 75, the card C is moved through a pattern as indicated by the arrows 76. Consequently, the magnetic stripe reader 78 senses the magnetic stripe 14 to provide substantive data including five hundred twelve binary bits representative of the two hundred fifty-six image pixels of a reference display. Those bits are stored in the register 84 for subsequent use by the correlator 86.

As the card moves past the magnetic stripe reader 78, it drops into a position for optical sensing by the quantizing control 80 and the image scanner 82. The quantizing control 80 simply senses the overall density of the image as a basis for establishing the three ranges of quantization. That is, based on the average optical density of the likeness 12 as sensed by the control 80, three broad ranges of quantizing are determined. As indicated above, the three ranges serve to classify each observed-pixel analog signal either as: (a) definitely darker than the average optical density, (b) definitely lighter than the average optical density or (c) in the range of the average optical density. Of course, other forms of thresholding are well known in the prior art and may be employed in different embodiments for use with the image scanner 82 which also may take a variety of different forms as well known in video and sensing technologies.

In the disclosed embodiment, the image scanner 82 scans the photographic likeness 12 (FIG. 2) in a raster pattern to dissect the image indicia into an array of two hundred fifty-six image pixels as explained above. In the disclosed embodiment, the pixels take the form of a continuous analog signal which is supplied to the unit 94 for sampling and quantizing in accordance with the ranges (a), (b) and (c) as explained above.

Quantized pixel-image sample signals of three different levels are supplied from the unit 94 to the digitizer 96 which converts the individual analog sample signals to a two-bit binary digital format. Accordingly, the digitizer 96 provides digital signal representations for two hundred fifty-six pixels, each of two bits. The resulting five hundred twelve binary bits are stored in the register 98. Thus, the data stored in the test register 98 has the same format as the data stored in the reference register 84.

A wide variety of correlators are well known in the prior art for comparing data to determine the degree of similarity. As mentioned above, in the disclosed embodiment, the correlator 86 simply performs a bit-by-bit correlation between reference and test image pixels. If the two bits representative of each of the similarly positioned pixels are identical, the correlator 86 provides a binary signal to the frame buffer 102 in a high state (representing one, white). Alternatively, if the representative reference and test data for a specific pixel area do not coincide, the correlator 86 provides a low level of the binary signal (indicative of a zero, black). Consequently, an array of ones and zeros are set in the frame buffer 102 coinciding to the picture or pixel display as will be provided. Again, the binary display D (FIG. 1) is a pixel array or grid which is white except for those areas where the test and reference data did not compare favorably. At such pixels, the display is black.

As indicated above, the frame buffer 102 acts through the definition unit 106 to refresh the liquid crystal display unit 108 (LCD) and provide the black-and-white binary display D. Image generation and refreshing techniques, as indicated above, are well known in the art. The frame buffer 102 functions accordingly through the definition unit 106 in combination with the display unit 108. In that relationship, the display selector 104 varies the number of pixels in the display D and may also accomplish displays limited to selective portions of the likeness 12.

To use the terminal T, an operator performs a relatively simple sequence of operations to accomplish detailed guidance as to the authenticity of a card C. Specifically, an operator initially checks the card C, visually comparing the photographic likeness 12 to the physical appearance of the cardholder. If there is a sufficient degree of similarity, and the card otherwise appears proper, the operator enters the card in the slot S (FIG. 1), moves it along the length of the slot and allows it to drop into the section 38.

The terminal senses the magnetic stripe 14 and optically dissects the photographic likeness 12 (FIG. 2) to provide pixel image signals which are sampled, quantized and digitized as one of three values. Such digital signals are provided as test values for comparison with reference values from the magnetic stripe 14 on a pixel-by-pixel basis. Favorable comparisons produce a binary one and unfavorable comparisons produce a binary zero. Accordingly, a binary or black-and-white picture array is defined in the frame buffer 102 (FIG. 4) which then drives the display unit 108.

The correlator 86 also incorporates a register for counting the number of zeros representing black display pixels (unfavorable comparison). If the register counts a relatively small number of black display pixels, the green signal 90 is actuated. Alternatively, if a sizable number of black display pixels are counted, the red signal 88 is energized. An intermediate number of black display pixels actuates the amber signal 92 instructing the operator to consult the display D (FIG. 1).

In considering the display D, the operator mentally correlates the area of black pixels in the display D to areas of the photographic likeness 12 (FIG. 2). The areas designated by black pixels indicate important interpretive information. First, as indicated above, if the black areas of the display D coincide with mars on the photographic likeness 12, the card C may be identified as simply a worn or aged card and likely authentic. Alternatively, if the black pixels identify the area of the face 24 (FIG. 2), there is probably good reason for greater concern. In such a case, the photographic likeness should attract attention as possibly having been altered or being counterfeit.

Considering another possibility, if the black pixels designate the area of the digit 54, it is likely the account number has been changed. Also, the occurrence of black pixels at the frame of the photographic likeness 12 might indicate a changed picture if, for example, the photographic likeness comprises a laminated photoprint. Black pixels in the area of the face 24 also suggest a problem. Thus, depending on the construction of the card C and the substance of the photographic likeness 12, considerable guidance is afforded an operator by the specific designation of areas in the photographic likeness 12 which do not compare well with the reference data.

As explained above, the crude or rough classification of pixels into a small number of classes, e.g. three, allows considerable deviation as a result of document use and aging. However, in view of the considerable number of pixels, the test tends to be quite reliable. Also, as indicated above, the disclosed embodiment allows a display alternative. Specifically, the normal display (FIG. 1, an eight-by-eight array) is provided in the initial operation. If greater detail is desired, the "detail" button 53 is depressed causing the display selector 104 to provide a sixteen-by-sixteen display array. Essentially, the selector 104 segments each pixel of the normal display to a set of four subpixels. The subpixels are then displayed. Note that in the normal display, if any of the subpixels is black, the pixel is black.

It is to be noted that in the original sensing, to provide the recorded data, it is not necessary to read every pixel in a photograph. If the checkerboard reading pattern is used, say the screen is divided into 1024 pixels and half that number, 512 pixels, are read during scanning. The figure "1024" is believed to provide: (1) the necessary discrimination within a single photograph to protect against effective alteration; and (2) the necessary discrimination between different photographs to permit individual separation.

From an information-theoretic standpoint the number 1024 may be larger than necessary; however, such will depend on applications and design considerations. Notice that the only function of the photograph, as far as the terminal's circuitry is concerned, is to provide those two discrimination factors. Accurate representation of the photograph itself is neither obligatory nor in any way of value.

From the above it will be apparent that the system of the present invention accommodates to the production and use of a document that is economical, practical and can be reliably authenticated.

Figure 5:
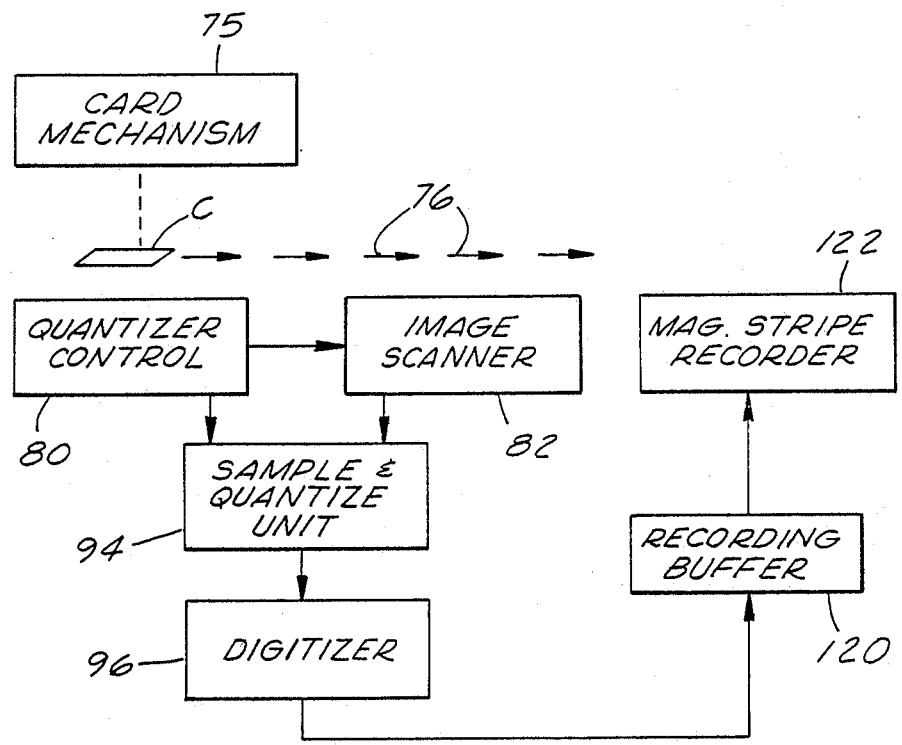
FIG. 5 is a block diagram of a production system incorporating the principles of the present invention.

To accomplish cards in accordance herewith and as described above, a system may be utilized incorporating select components from the system of FIG. 4. Specifically, such a card production system is illustrated in FIG. 5. Components in FIG. 5 similar to components in FIG. 4 bear similar names and reference numerals.

Recapitulating to some extent, a card C (FIG. 5) moves along a path designated by arrows 76 under control of the card mechanism 75. During the course of that passage, the card C is sensed by the quantize control 80 and the image scanner 82 to provide a signal to the sample and quantize unit 94 which in turn drives the digitizer 96. As a consequence, digital signals as explained above are provided indicative of image pixels representing the dissection of the photographic likeness 12 (FIG. 2).

In the system of FIG. 5, the representative digital signals from the digitizer 96 are applied to a recording buffer 120 which in turn drives a magnetic stripe recorder 122. As indicated, the magnetic stripe recorder 122 is positioned in alignment with the path defined by the arrows 76 so that after the photographic likeness 12 (FIG. 1) is dissected and reduced to digital signals, those signals are recorded on the magnetic stripe 14 (FIG. 2). As indicated above, the magnetic stripe 14 may carry a variety of other data in accordance with well known teachings of the prior art. Such data might serve to further confirm the authenticity or validity of the card C. Also, such data might be employed to control the use of the card C.

In a production terminal embodied in accordance with the structures illustrated in FIGS. 1, 4 and 5, the motion pattern of the card C would differ from that of FIG. 1. Specifically, the optical sensing would precede the magnetic recording. However, in actual practice it is likely that cards C would be produced using volume production techniques with card movement completely mechanized.

From the above it may be seen that systems and apparatus embodying the present invention can be effectively implemented and employed to reliably identify subjects for any of a variety of occurrences or transactions. It will also be apparent as indicated above that systems and apparatus incorporating the principles of the present invention may be variously implemented in a wide variety of different specific forms. Accordingly, the scope hereof is deemed to be as set forth in the claims below.

What is claimed is:

1. A verification system for documents bearing machine-readable identification indicia subject to alteration by wear, damage or counterfeiting and related to an accessible memory comprising:
    means for reading said indicia to provide representative pixel test signals for an array including at least part of said indicia;
    means for providing representative pixel reference signals for said array from said accessible memory;
    means for corelating said test signals and said reference signals pixel-to-pixel to provide and correlation signals; and
    display means controlled by said correlation signals for indicating the locations of specific areas of said document for which said pixel test signal fails to correlate with said pixel reference signal thereby assisting an operator in visually determining whether those specific areas of said document indicated by said display means have been tampered with or said document has merely been subject to wear and tear.

2. A system according to claim 1 wherein said display means includes a pixel display device related in a pixel-to-pixel relationship with said machine-readable indicia.

3. A system according to claim 2 wherein said display device includes a pixel display screen to manifest said pixels in a binary format.

4. A system according to claim 1 wherein said means for providing pixel reference signals includes means for sensing said document.

5. A system according to claim 1 wherein said pixel signals are provided in digital form.

6. A system according to claim 1 wherein said pixel signals are quantized to one of three levels.

7. A system according to claim 1 wherein said display device includes a liquid crystal display to manifest said pixels in a binary format and wherein said pixel signals are provided in digital form and are quantized to one of three levels.

8. A verification system for documents bearing machine-readable identification indicia subject to alteration by wear damage or counterfeiting and related to an accessible memory, comprising:

means for reading said indicia to provide representative pixel test signals for an array including at least part of said indicia;

means for providing representative pixel reference signals for said array from said accessible memory;

means for correlating said test signals and said reference signals pixel-to-pixel to provide correlation signals;

display means controlled by said correlation signals for indicating the locations of specific areas of said document for which said pixel test signal fails to correlate with said pixel reference signal, thereby enabling an operator in visually determining whether those specific areas of said documents indicated by said display means have been tampered with or said documents have merely been subject to wear and tear; and means for enabling detailed display of said correlation signals on a subpixel-to-subpixel basis.

9. A system according to claim 8 wherein said display means includes a pixel display device related in a subpixel-to-subpixel relationship with said machine-readable indicia.

10. A system according to claim 8 wherein said display means includes a pixel display device capable of manifesting said subpixels in a binary format.

* * * * *